United States Patent [19]

Gould et al.

[11] Patent Number: 4,504,112

[45] Date of Patent: Mar. 12, 1985

[54] HERMETICALLY SEALED OPTICAL FIBER

[75] Inventors: Gordon Gould, Great Falls, Va.; Charles I. Soodak, Silver Spring, Md.; Robert E. Thompson, Roanoke, Va.

[73] Assignee: Chevron Research Company, San Francisco, Calif.

[21] Appl. No.: 408,971

[22] Filed: Aug. 17, 1982

[51] Int. Cl.³ .................................... G02B 5/16
[52] U.S. Cl. ..................... 350/96.23; 219/121 LC
[58] Field of Search ............. 350/96.23; 219/121 LC, 219/121 LD

[56] References Cited

U.S. PATENT DOCUMENTS

| 2,706,376 | 5/1954 | Kerr | 57/6 |
|---|---|---|---|
| 3,955,878 | 5/1976 | Nowak | 350/96 R |
| 4,039,248 | 8/1977 | Franke et al. | 350/69 B |
| 4,078,853 | 3/1978 | Kempf et al. | 350/96.23 |
| 4,117,300 | 9/1978 | Richards | 219/121 LM |
| 4,162,400 | 7/1979 | Pitts | 250/256 |
| 4,239,336 | 12/1980 | Parfree et al. | 174/70 R X |
| 4,263,495 | 4/1981 | Fujita et al. | 219/121 LC X |
| 4,359,598 | 11/1982 | Dey et al. | 350/96.23 X |
| 4,367,917 | 1/1983 | Gray | 350/96.23 |

FOREIGN PATENT DOCUMENTS

| 2836314 | 2/1980 | Fed. Rep. of Germany . |
|---|---|---|
| 2920428 | 11/1982 | Fed. Rep. of Germany . |
| 1073958 | 6/1967 | United Kingdom . |
| 1438074 | 6/1976 | United Kingdom . |
| 2029048 | 3/1980 | United Kingdom . |
| 2084757 | 4/1982 | United Kingdom . |
| 2085187 | 4/1982 | United Kingdom . |
| 2088584 | 6/1982 | United Kingdom . |

Primary Examiner—William L. Sikes
Assistant Examiner—Akm E. Ullah
Attorney, Agent, or Firm—S. R. LaPaglia; E. J. Keeling; A. Stephen Zavell

[57] ABSTRACT

A hermetically sealed optical fiber tube and process of fabrication. The hermetically sealed tube is fabricated from rolled wires into shaped sectors such that when the sections are joined a cylindrical tube is formed having a sufficient inside diameter to accept one or a plurality of buffered optical fibers.

13 Claims, 2 Drawing Figures

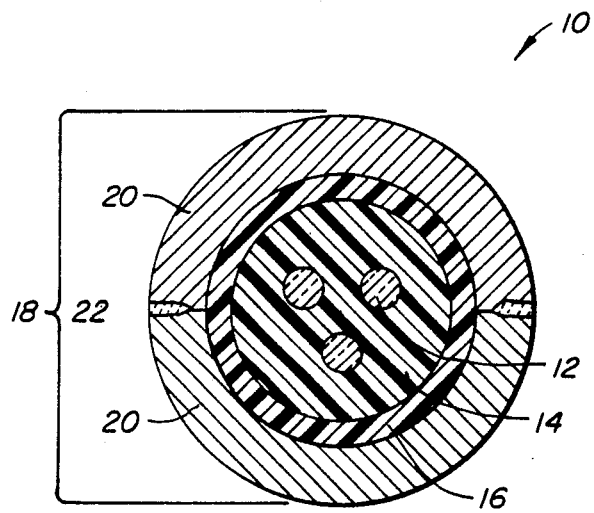
FIG._1.
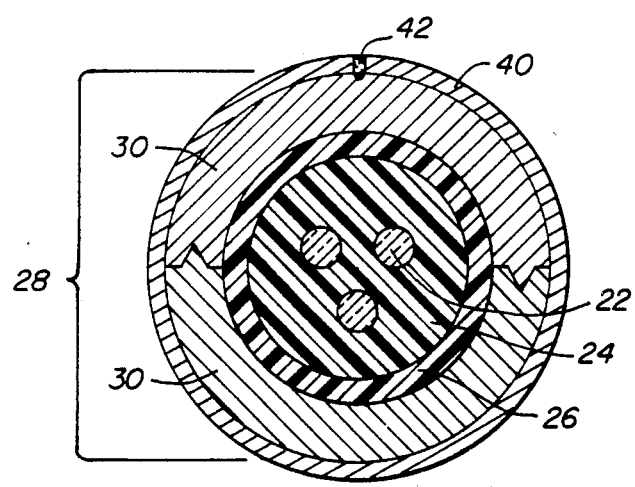
FIG._2.

HERMETICALLY SEALED OPTICAL FIBER

The invention relates to optical fibers. More specifically, the invention relates to hermetically sealed optical fibers and a method of encasing optical fibers with a hermetically sealed metal tube.

BACKGROUND OF THE INVENTION

Glass optical fibers are replacing conventional insulated electrical conductors in communications cables because the fibers, guiding modulated light signals instead of electrical signals, offer increased channel capacity or greater data transmission rates through long cable lengths without repeaters. Conventional electrical cables have signal transmission bandwidths that are limited to about 100 KHz through lengths up to 30,000 feet. By contrast, optical fibers can transmit signal bandwidths up to 100 MHz through this length. This corresponds to 3 orders of magnitude larger data transmission rate.

Glass optical fibers have two properties which make it difficult to successfully incorporate them into cables which will be stretched when used, or which will be used under water, particularly at high pressure and/or high temperature, such as one finds down in an oil well drill hole. These properties are static fatigue degradation and microbending loss.

Silica glass fibers have small cracks (microcracks) on their surfaces. The depth of these microcracks can increase through a stress-accelerated chemical reaction, between the silica glass and moisture, called static fatigue. The tensile strength of the glass fiber decreases substantially as the microcracks increase in depth. Glass is an elastic material with a high Young's modulus. Strain in a glass optical fiber generates tensile stress and results in static fatigue. Thus, glass optical fibers are not suitable for use under high strain (greater than 0.5%) in the presence of moisture over extended periods of time. No plastic can provide adequate protection since water diffuses through all of them to some degree.

Loss of light through small bends in the fiber (microbending loss) is here described. Optical fibers transmit light signals by the principle of total internal reflection. This principle depends upon the light rays being totally reflected back into the core region each time they impinge upon the core to cladding interface of the optical fiber. Total internal reflection can only occur when the angle of incidence between the rays and the core to cladding interface is below a certain critical value. Bending of an optical fiber causes some of the light which is propagating in the fiber core to impinge upon the core to cladding interface at angles of incidence greater than the critical value and to be refracted out of the optical core and lost. The amount of the light that is lost becomes greater as the effective diameter of the bend becomes smaller. When the bending of the optical fiber is caused by deflection due to local lateral forces, the resulting decrease in signal strength (and decrease in the length of cable which can be used) is called microbending loss. When an optical fiber is deflected by a local inhomogeneity, such as a lump in its coating layers, the effective diameter of the bend depends upon the local strain the fiber is under. Generally, the fiber will bend to a smaller effective diameter as the strain level it is under increases. Consequently, higher strain levels result in higher levels of microbending loss.

Microbending losses in fibers are greatly reduced by first coating the fibers with a soft elastomer such as silicone rubber, and encasing this buffered fiber in a rigid jacket which can withstand external forces. However, plastics such as silicone rubber lose their integrity under conditions encountered in harsh environments such as at the bottom of a deep well, i.e., when subjected to hot brine at pressures up to 20,000 psi and temperatures up to 500° F.

A possible solution to these problems is described in European Pat. No. 0 48 674, entitled Fiber Optic Cable and Core, and issued to the Schlumberger Company. In this design a metal strip is wrapped helically around a core containing optical fibers, and then a second metal strip is wrapped around the first in such a way as to overlap the abutting edges of the first helix. Then the strips are soldered together to hermetically seal the tube so formed. The biggest drawback to this design is that when the tube is bent over a sheave or spool the seal is subjected to the longitudinal stress on the outside of the bend, and will give way and open up. In addition, sealing a spiral seam with a material other than solder or glue, e.g. welding, would be prohibitively expensive.

Thus, it would be highly desirable to have a hermetically sealed tube which is formed so as to avoid the tendency to open up when bent over a spool and/or subjected to longitudinal stress. It would also be highly desirable to have a process, and the product resulting therefrom, of producing a hermetically sealed metal tube which can be formed around a stranded and buffered optical fiber without stretching the fiber or introducing microbends.

Standard methods of forming welded metal tubes start with a flat strip which is formed by bending into a tube shape with appropriate rollers and butt-welded at the edges. This fabrication process requires the strips to be thin and annealed. If the material to be worked is a potentially high strength steel or other alloy, it can be work hardened by passage through a drawing or sinking die. A sunk metal tube is defined as a tube the diameter of which has been reduced by passage through a die without using an internal support. The strip must be configured so that the final metal tube will have a sufficient wall thickness to preclude buckling under pressure. Also, the tube must have a sufficiently high yield strain to avoid inelastic stretching when bent over a sheave or cable reel. The pressure buckling can be eliminated by building up several welded layers of increasing inside and outside diameter as has been successfully performed around conventional insulated wires. However, glass fibers cannot stand the stretch of the drawing or sinking process to work harden the metal. Thus, a method of tube forming which avoids the drawing or sinking process but nevertheless results in high tensile yield strengths is desirable.

SUMMARY OF THE INVENTION

We have invented a method of fabricating a hermetically sealed tube around one or a plurality of buffered optical fibers and the product therefrom. Buffering refers to a process of coating the optical fiber with a suitable cushioning material such as an elastomer. The fabrication is performed so that the fibers are sealed in the tube without stretching them so as to avoid the introduction of strain, microbends, or or water-enhanced microcracks.

BRIEF DESCRIPTION OF THE DRAWINGS

FIG. 1 refers to a cross-sectional view of an embodiment of the invention.

FIG. 2 refers to a cross-sectional view of an alternative embodiment of the invention.

DETAILED DESCRIPTION OF THE INVENTION

The hermetically sealed tube of the invention will be more clearly illustrated by referring to FIG. 1. FIG. 1 illustrates a cross-section of a hermetically sealed tube 10 containing a plurality of optical fibers 12. Suitable optical fibers with a thin protective coating of UV cured acrylic-based plastic are manufactured by the Valtec Co. in Massachusetts. The optical fibers are then coated with cushioning material 14 such as silicone RTV elastomer. The coated fibers are preferably helically wound around each other to form a single unit. Additional elastomer or other suitable flood material 16 is added to partially or as illustrated completely fill the tube during the fabrication of the complete tube 10. The tube 18 is fabricated from hemicylindrical sections 20 which are preshaped by rolling or drawing from an annealed wire. Although two sections 20 are illustrated, the tube 10 can be formed from any number of sections. The rolling or drawing of the cylindrical sections work hardens the metal before the fiber is enclosed therein. The cylindrical sections are made from steel or other alloy wire which can optionally be precipitation hardened to yield a high yield strength by heat treatment before welding. Precipitation hardening is defined as a process of hardening in which a constituent precipitates from a supersaturated solid solution. Thus the work hardened metal may be further enhanced in yield strength by precipitation hardening. Suitable standard rolling machines and processes such as those used by the Shaped Wire Co. of Illinois, can be used to squeeze wire into the hemicylindrical sections 20 which form the tube 18. Suitable examples of stainless steel wire or other suitable material are 17-7 PH stainless steel, a product of Armco, MP-35 nonferrous alloy, a product of Latrobe Steel Co., Latrobe, PA. The sections formed from the wires should have a yield stress greater than about 100,000 psi and preferably greater than about 150,000 psi. If greater yield stress is needed, these wire materials can be precipitation hardened to greater than about 250,000 psi yield stress. This corresponds to greater than about 0.85 yield strain. Yield strain is defined as the maximum strain that can be applied without substantial permanent deformation of the test specimen. This permits the tube to run over about a 36" and preferably a 24 inch diameter sheave or less or wound around a 36" and preferably a 24 inch diameter or less cable reel barrel under working load without yielding inelastically. The sections 20 are pressed together and welded where the edges meet by welds 22 to hermetically seal the fibers 12 therein. During the fabrication of the tube, the stranded and buffered fibers are fed between the cylindrical sections as they come together with enough clearance to avoid pinching. The welding is preferably done with laser welding which makes a clean melt which can be confined to a small volume which does not penetrate all the way through the wall, and therefore does not anneal the whole wall thickness and does not destroy the buffered fibers.

For further protection, the completed tube can be coated with a hard plastic of a suitable material such as polyvinylidene difluoride (Kynar ®) or polyetheretherketone (PEEK ®).

As a specific embodiment of the invention suitable for use in high temperature and/or higher pressure cables for well-logging, seismic applications and the like, the sealed tube can be formed by rolling 17-7 PH stainless steel or MP-35 nonferrous alloy into two sections which fit together longitudinally to form the tube. The longitudinal seams are subjected to only a small secondary shear stress when the tube is bent over a sheave or spool. For the preferred embodiment, the wire should be of sufficient thickness such that the final sectors when pressed together have an inside diameter of 0.06 inches and an outside diameter after welding of between about 0.110 to about 0.120 inches. The fiber optics are placed within the sections after forming and prior to welding. Optionally, the final hermetically sealed tube can be galvanized or coated with plastic material such as PEEK or Kynar to an outside diameter thickness of about 0.120 inches. A tube having this diameter finds application as the central core in an armored optical fiber cable for well logging or other uses. The armored optical fiber cable is described in an application entitled "Armored Optical Fiber Cable" by the inventor Robert Everette Thompson, filed concurrently herewith and incorporated herein by reference. A suitable wall thickness for the two sectors would be about 0.027±0.002 inches.

Turning now to FIG. 2. FIG. 2 illustrates an alternative embodiment of the invention. FIG. 2 illustrates a tube containing optical fibers 22 coated with a suitable elastomer 24 and affixed to one of the halves of the tube by a suitable elastomer 26 which partially or as illustrated completely fills the tube 28. The tube 28 formed with halves 30 is shaped by rolling of a suitable stainless steel or nonferrous alloy wire. The tubes are optionally fabricated with dove-tail ends so that they securely fit within each other. Outside the cylindrical sections 30 is a roll formed and welded metal tube 40. The metal tube 40 is laser welded with a suitable laser such as a $CO_2$ laser. The tube 40 is preferably fabricated from an extremely corrosion resistant material such as Inconel ®. Optionally, the depth of the laser weld 42 during welding can be adjusted so that the weld passes through the outer metal tube and into one of the inner tube halves, 30. This securely hermetically seals the optical fibers within the tube. An alternative option is to dip or plate the outer covering with a suitable material which resists corrosion.

The hermetically sealed tube containing the optical fibers can be fabricated according the following procedure. Annealed stainless steel or other suitable nonferrous alloy wires are rolled by shaped rollers into cylindrical sections such that upon passing through guide rollers the sections form a tube having a sufficient internal diameter to contain the optical fibers without pinching the fibers. The rolled sections are then precipitation hardened at a temperature of about 1,000° C. Preferably, the tube is formed of only two hemicylindrical sections because this minimizes the number of welds. Suitable rolled sections are obtained from The Shaped Wire Co., St. Charles, Ill. Cylindrical sections can be pressed together by standard pressing rollers such as used by Laser Applications Inc., Baltimore, Md. prior to and during the laser welding. The helically wound coated fibers are inserted between the sections as they are squeezed together and additional elastomeric material is added to adhere the fibers thereto prior to welding.

The laser welding is performed with a 500 watt industrial $CO_2$ laser of Control Laser Corp. The laser is focused to a width of about 0.15 mm. The tube is welded to a depth which is less than the thickness of the sections. A depth of about 0.40 mm is suitable in the fabrication of an outside tube having a diameter of about 0.110–0.120 inches. Optionally, the cylindrical sectors may be heated to between 300° F. and about 500° F. during welding. The heating facilitates the welding process and also results in up to about 0.2% contraction of the tube when it cools. This obviates up to about 0.2% stretch of the fiber due to thermal expansion when the cable is lowered in a drill hole experiencing temperatures on the order of up to about 500° F.

The welding process leaves the seams in a strained condition, a heat treatment at about 500° F. for a few hours after welding relieves such strains without annealing the precipitation hardened tube. Precipitation hardening the tube is not possible once the optical fiber is enclosed therein because this overheats and destroys the buffering polymers. After welding, the tube can optionally be nickel plated or galvanized to resist corrosion and finally the tube may optionally be covered with an extrusion of a high melting point plastic such as PEEK ® or Kynar ® to minimize the diffusion of brine into any pin holes left after welding and also to protect the metal from corrosion. Suitable extrusions are made by the Berk Tek Co. of Pennsylvania.

We have described our invention with reference to particularly preferred embodiments. However, it is to be understood that the invention is not limited solely to the preferred embodiments described herein. Modifications which would be obvious to the ordinary skilled artisan are intended to be within the scope of the invention. For example, soldering, although more expensive and time consuming, can be substituted for welding. In a similar manner, any suitable high tensile strength steel or high temperature softening plastics can be employed to fabricate the tube or be used as coatings. Furthermore, the requirements of high tensile steel or nonferrous alloys can be minimized or reduced where a hermetically sealed tube is needed which will not be subjected to the stresses borne, for example, by a well logging cable.

What is claimed is:

1. A hermetically sealed optical fiber working tube for use in environments requiring resistance to buckling under pressure and inelastic stretching thereof when subjected to longitudinal elongation, relaxation and bending forces, said tube comprising:
    an inner core having one or a plurality of buffered optical fibers; and
    at least two metal sections fitting together around said inner core and forming a cylindrical tube, said metal sections hermetically joined into said tube, wherein said metal sections were preshaped by rolling from an annealed wire and said metal sections are selected to have a yield strain greater than about 0.85.

2. The tube according to claim 1 wherein said sections are capable of undergoing precipitation hardening after being rolled forming into cylindrical sections and prior to being joined by laser welding.

3. The tube according to claim 1 wherein said sections are fabricated from 17-7 PH stainless steel or MP-35 nonferrous alloy wires.

4. The tube according to claims 1, 2 or 3 wherein said metal sections are hermetically joined at longitudinal seams.

5. The tube according to claim 3 wherein the sections are fabricated such that the rolled shaped wires form a tube having an outer diameter of from about 0.110 to about 0.120 inches with a wall thickness of about 0.027 inches and an inside diameter of about 0.06 inches.

6. The tube according to claim 4 wherein the tube is formed from two sections.

7. The tube according to claim 5 wherein the tube is further coated with a corrosion resistant metal layer or high temperature plastic to an outer diameter of about 0.120±0.002 inches.

8. The tube according to claim 4 wherein the tube containing the fibers is heated to between about 300° F. to about 500° F. during the joining of the sections by laser welding.

9. The tube according to claim 4 wherein the sections are pressed together and an outer coating of a roll formed metal tube is fabricated around the inner sections and said outer metal tube is welded to a depth greater than the thickness of said outer metal tube.

10. The tube according to claim 5 wherein the optical fibers are single mode optical fibers.

11. The tube according to claim 1 wherein said tube exhibits a yield stress greater than about 100,000 psi.

12. The tube according to claim 2 wherein said tube exhibits a yield stress greater than about 150,000 psi.

13. The tube according to claim 4 wherein said tube exhibits a yield stress greater than about 100,000 psi.

* * * * *